(12) United States Patent
Mirzaee et al.

(10) Patent No.: US 12,028,285 B2
(45) Date of Patent: Jul. 2, 2024

(54) REFERENCE SIGNALS PORTS EXTENSION FOR LARGE ANTENNA ARRAYS

(71) Applicant: Telefonaktiebolaget LM Ericsson (publ), Stockholm (SE)

(72) Inventors: Alireza Mirzaee, Ottawa (CA); Rozita Rashtchi, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 368 days.

(21) Appl. No.: 17/623,697

(22) PCT Filed: Jul. 12, 2019

(86) PCT No.: PCT/IB2019/055971
§ 371 (c)(1),
(2) Date: Dec. 29, 2021

(87) PCT Pub. No.: WO2021/009535
PCT Pub. Date: Jan. 21, 2021

(65) Prior Publication Data
US 2022/0278794 A1    Sep. 1, 2022

(51) Int. Cl.
*H04L 5/00* (2006.01)
*H04B 7/06* (2006.01)
*H04W 16/28* (2009.01)

(52) U.S. Cl.
CPC ......... *H04L 5/0048* (2013.01); *H04B 7/0617* (2013.01); *H04W 16/28* (2013.01)

(58) Field of Classification Search
None
See application file for complete search history.

(56) References Cited

U.S. PATENT DOCUMENTS

| 2014/0098689 | A1  | 4/2014 | Lee et al. | |
| 2019/0103994 | A1* | 4/2019 | Kakishima | H04B 7/0479 |
| 2021/0021318 | A1* | 1/2021 | Li | H04L 5/0005 |

OTHER PUBLICATIONS

International Search Report and Written Opinion dated Feb. 27, 2020 issued in PCT Application No. PCT/IB2019/055971, consisting of 17 pages.

(Continued)

*Primary Examiner* — Christine T Duong
(74) *Attorney, Agent, or Firm* — Weisberg I.P. Law, P.A.

(57) ABSTRACT

A method and network node for beamforming a physical downlink shared channel and broadcasting a reference signal, the network node having N antenna elements and M reference signal ports, N being greater than M. A method includes assigning the M reference signal ports to M antenna elements of the N antenna elements. A reference signal is transmitted using the M antenna elements, the M antenna elements used to form a first beam sufficiently broad to broadcast the reference signal over a geographical area sized to support a plurality of wireless devices (WDs). A precoding matrix indicator is received from a first WD of the plurality of WDs, using the N antenna elements, signals received at the N antenna elements being weighted to form a second beam sufficiently narrow to enable spatial selection of the first WD of the plurality of WDs by the network node.

20 Claims, 10 Drawing Sheets

(56) References Cited

OTHER PUBLICATIONS

3GPP TSG-RAN WG1 #66; R1-112420; Athens, Greece Aug. 22-26, 2011; Source: Alcatel-Lucent Shanghai Bell, Alcatel-Lucent; Title: Considerations on CSI Feedback Enhancements for High-Priority Antenna Configurations; Agenda Item: 6.6.2.1; Document for: Discussion/Decision, consisting of 7 pages.

European Communication Pursuant to Article 94(3) EPC dated Mar. 20, 2024, issued in corresponding European Patent Application No. 19 773 163.1, consisting of 8 pages.

* cited by examiner

REFERENCE SIGNALS PORTS EXTENSION FOR LARGE ANTENNA ARRAYS

CROSS-REFERENCE TO RELATED APPLICATIONS

This application is a Submission Under 35 U.S.C. § 371 for U.S. National Stage Patent Application of International Application Number: PCT/IB2019/055971, filed Jul. 12, 2019 entitled "REFERENCE SIGNALS PORTS EXTENSION FOR LARGE ANTENNA ARRAYS," the entirety of which is incorporated herein by reference.

TECHNICAL FIELD

Wireless communication and in particular, to extension of reference signal ports for large antenna arrays.

BACKGROUND

In closed-loop beamforming, a base station such as an eNB for Third Generation Partnership Project (3GPP) Long Term Evolution (LTE) networks and a gNB for 3GPP 5G (5G is also referred to as New Radio (NR)) transmits reference signals such as, for example, cell specific reference signals (CSR) and channel state information reference signals (CSI-RS). These signals help the wireless device (WD) to find the best codebook from a set of predefined codebooks that achieves the highest throughput for a given channel condition. The WD then reports back a precoder matrix indicator (PMI) along with rank (RI) and channel condition (as may be indicated by a channel quality indicator (CQI)) to the base station. The base station then may use the reported PMI to perform precoding of the physical downlink shared channel (PDSCH) using a shared channel port to antenna mapping.

Conventionally, all antenna elements are used to transmit the reference signal, and the reported PMI is used to create beamformed shared traffic channels using all the same antenna elements (same port to antenna mapping) as are used for the reference signals. More particularly, for 3GPP Transmission Mode 9 (TM9), one way to beamform is to transmit CSI-RS signals using a port to antenna mapping that uses all the antenna elements of the transmitter and creates a specific beam pattern. When the WD reports the PMI, the same port to antenna mapping in conjunction with the desired precoder is used to create the beamformed shared traffic channel towards the WD. This is a problem in lengthy arrays where the number of antennas is larger than the number of CSI-RS ports. In these cases, one practice is to connect multiple antennas (directly or indirectly) to each port. The resulting common beam therefore gets narrower compared to when each port connects to only one antenna. A narrower common beam affects the coverage of CSI-RS. Thus, fewer WDs will be able to realize the potential beamforming gain of lengthy arrays. Moreover, it is more difficult to uniformly cover the cell with each distinct PMI, resulting in creation of more interference and some coverage gap for the reference signals.

SUMMARY

Some embodiments advantageously provide a method and system for extension of reference signal ports for large antenna arrays.

In conventional beamforming schemes, to realize the potential gain of beamforming using lengthy arrays, since each reference signal is connected to multiple antenna elements, the CSI-RS beam patterns get narrower as the number of transmit antenna increases. As such, the CSI-RS signals cannot cover the cell coverage area properly which results in poor overall system performance. The proposed techniques not only provide sharp beams toward WDs by enhancing the beamforming, but also keep the CSI-RS beam patterns broad to maintain the coverage even in lengthy arrays of antennas.

According to one aspect, a method in a network node having N antenna elements and M reference signal ports, N being greater than M, is provided. The method includes assigning the M reference signal ports to M antenna elements of the N antenna elements. The method also comprises transmitting a reference signal using the M antenna elements, the M antenna elements used to form a first beam sufficiently broad to broadcast the reference signal over a geographical area sized to support a plurality of wireless devices, WDs. The method further includes receiving a precoding matrix indicator, PMI, from a first WD of the plurality of WDs, using the N antenna elements, signals received at the N antenna elements being weighted to form a second beam sufficiently narrow to enable spatial selection of the first WD of the plurality of WDs by the network node.

According to this aspect, in some embodiments, the method further includes transmitting a demodulation reference signal, DMRS, and/or a physical downlink shared channel, PDSCH, using the N antenna elements with the transmitted signal being weighted to form the second beam. In some embodiments, the M antenna elements are distributed among the N antenna elements, there being at least one intervening antenna element of the N antenna elements between any consecutive ones of the M antenna elements. In some embodiments, the method also includes identifying which one of two or more main lobes appearing in a signal from the M antenna elements is not a grating lobe. In some embodiments, a phase of an antenna element that is not one of the M antenna elements is extrapolated from phases of at least one of the M antenna elements. In some embodiments, the received PMI indicates a phase shift on every other antenna of the N antenna elements. In some embodiments, the M antenna elements form a spatially broad reference signal beam and the N antenna elements form a spatially narrow downlink signal beam, the spatially broad reference signal beam being broader than the spatially narrow downlink signal beam. In some embodiments, beamforming weights are applied to signals of the N antenna elements to steer a directive beam toward the first WD of the plurality of WDs. In some embodiments, the M reference signal ports are channel state information reference signal, CSI-RS, ports. In some embodiments, the M antenna elements are adjacent in a row or column of the N antenna elements.

According to another aspect, a network node having N antenna elements and M reference signal ports, N being greater than M includes processing circuitry configured to assign the M reference signal ports to M antenna elements of the N antenna elements, cause transmission of a reference signal using the M antenna elements, the M antenna elements used to form a first beam sufficiently broad to broadcast the reference signal over a geographical area sized to support a plurality of wireless devices, WDs, and cause reception of a precoding matrix indicator, PMI, from a first WD of the plurality of WDs, using the N antenna elements, signals received at the N antenna elements being weighted to form a second beam sufficiently narrow to enable spatial selection of the first WD of the plurality of WDs by the network node.

According to this aspect, in some embodiments, the processing circuitry is further configured to cause transmission of a demodulation reference signal, DMRS, and/or a physical downlink shared channel, PDSCH, using the N antenna elements with the transmitted signal being weighted to form the second beam. In some embodiments, the M antenna elements are distributed among the N antenna elements, there being at least one intervening antenna element of the N antenna elements between any consecutive ones of the M antenna elements. In some embodiments, the processing circuitry is further configured to identify which one of a plurality of main lobes appearing in a signal from the M antenna elements is not a grating lobe. In some embodiments, a phase of an antenna element that is not one of the M antenna elements is extrapolated from phases of at least one of the M antenna elements. In some embodiments, the received PMI indicates a phase shift on every other antenna of the N antenna elements. In some embodiments, the M antenna elements form a spatially broad reference signal beam and the N antenna elements form a spatially narrow downlink signal beam, the spatially broad reference signal beam being broader than the spatially narrow downlink signal beam. In some embodiments, beamforming weights are applied to signals applied to the N antenna elements to steer a directive beam toward the first WD. In some embodiments, the reference signal ports are channel state information reference signal, CSI-RS, ports. In some embodiments, the M antenna elements are adjacent in a row or column of the N antenna elements.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
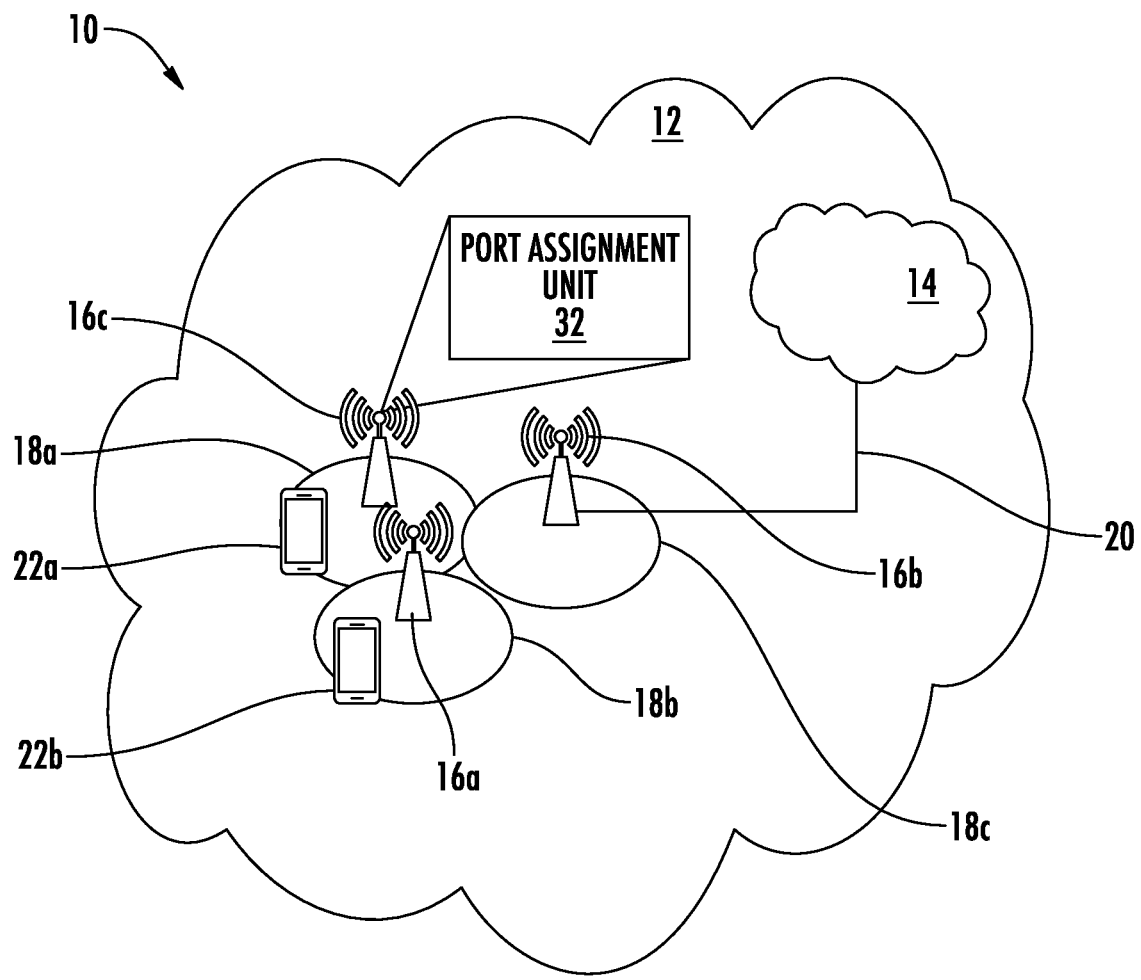
FIG. 1 is a block diagram of a wireless communication system with a based station having a port assignment unit in accordance with principles set forth herein.

Before describing in detail exemplary embodiments, it is noted that the embodiments reside primarily in combinations of apparatus components and processing steps related to extension of reference signal ports for large antenna arrays. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. In some embodiments, The network node, e.g., base station, may operate in Transmission Mode 9, as an example of a close loop beamforming scheme which uses CSI-RS as the reference signals. This mode has the flexibility to use any beamforming patterns towards the WD using a demodulation reference signal (DMRS). Any other transmission schemes in Long Term Evolution (LTE) or New Radio (NR) or any other radio access technologies either in the downlink (DL) or uplink (UL) that are closed loop and rely on reference signals and has DMRS can use the methods disclosed herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. This wireless link is shown as connection 73. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

In some embodiments, a network node 16 is configured to include a port assignment unit 32 which is configured to assign M reference signal ports to M antenna elements of N antenna elements, N being greater than M.

Example implementations, in accordance with an embodiment, of the WD 22, network node 16 and host computer 24 discussed in the preceding paragraphs will now be described with reference to FIG. 2.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. Each RF transceiver/RF transmitter/RF receiver may have a plurality of antennas 43.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include port assignment unit 32 which is configured to assign M reference signal ports to M antenna elements of N antenna elements, N being greater than M.

The communication system 10 further includes the WD 22 already referred to. The WD 22 may have hardware 60 that may include a radio interface 62 configured to set up and maintain a wireless connection 64 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
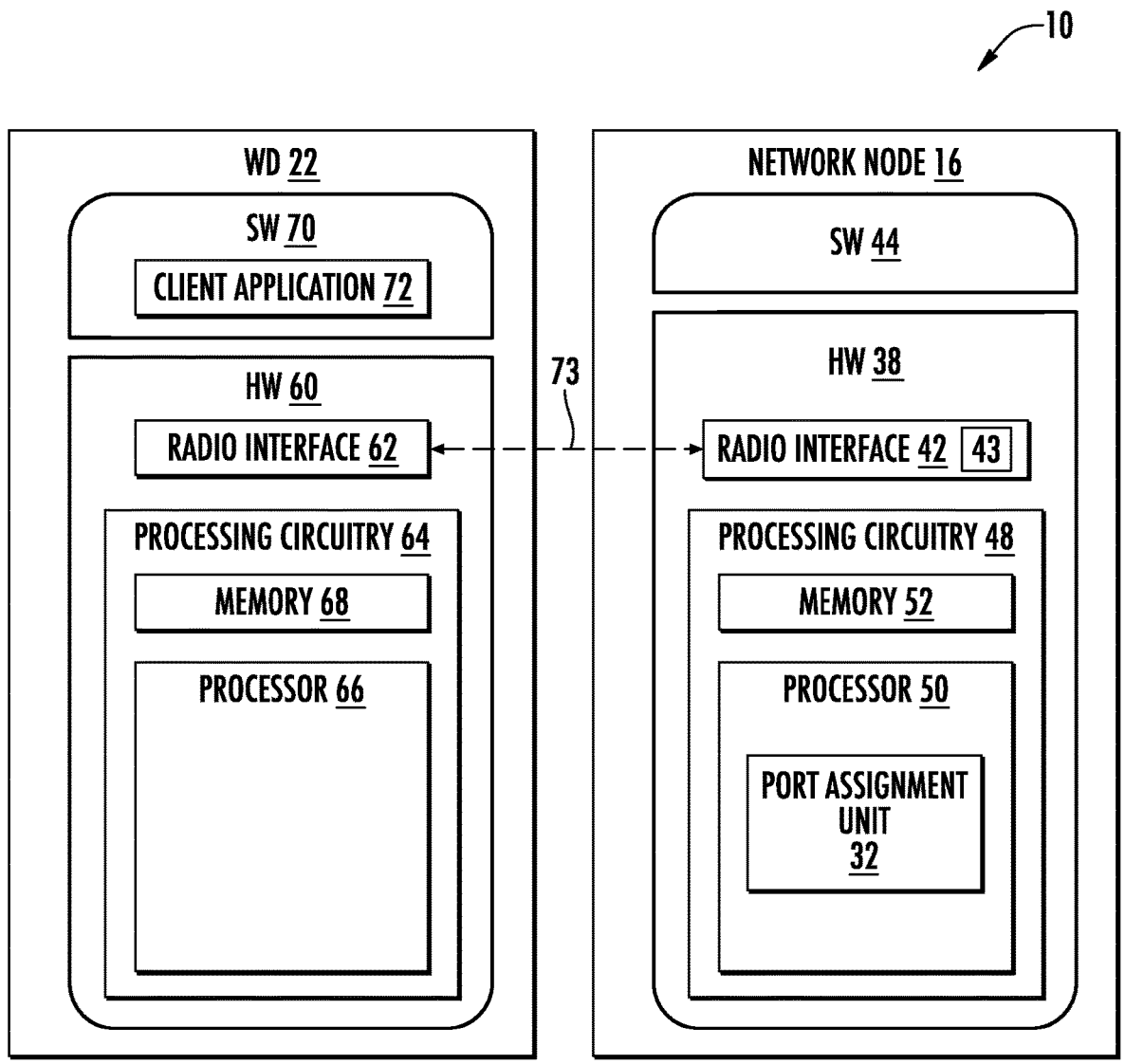
FIG. 2 is a block diagram of a wireless device and a network node having a port assignment unit in accordance with principles set forth herein.

In some embodiments, the inner workings of the network node 16 and WD 22 may be as shown in FIG. 2 and independently, the surrounding network topology may be that of FIG. 1.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as port assignment unit 32, as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
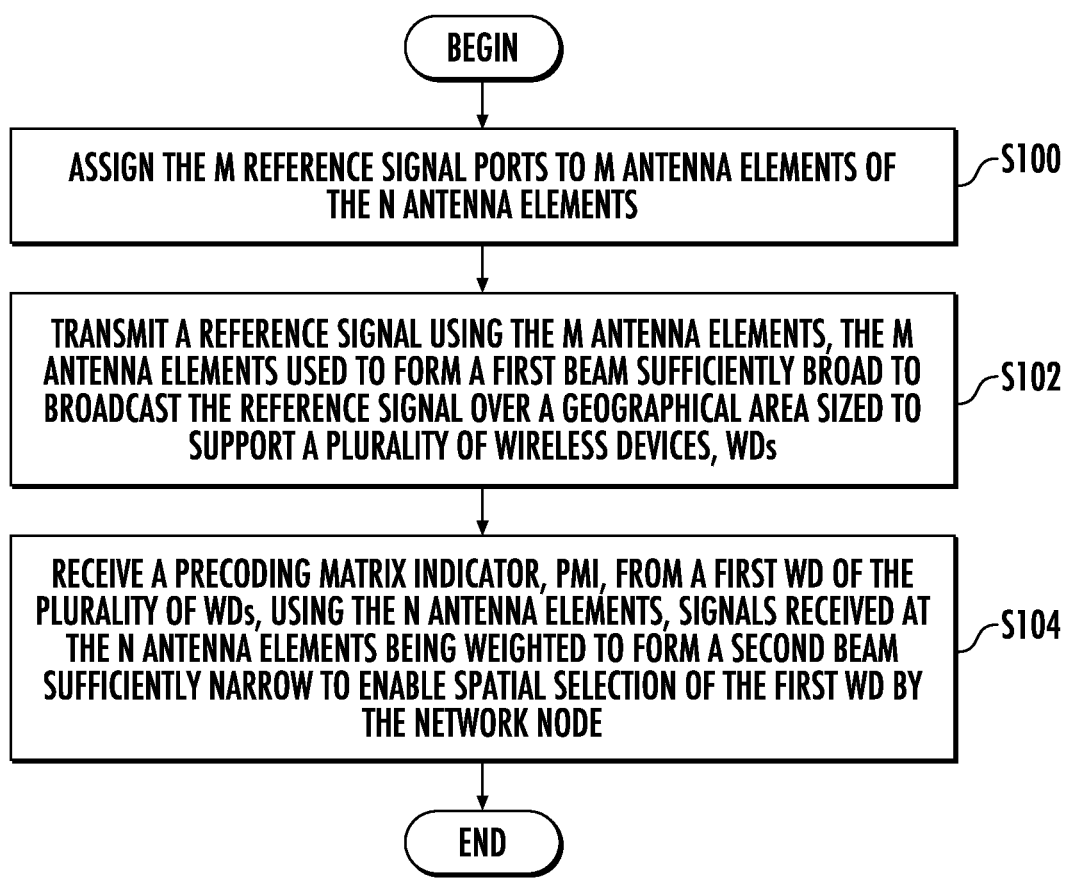
FIG. 3 is a flowchart of an exemplary process for extension of reference signal ports for large antenna arrays.

FIG. 3 is a flowchart of an exemplary process in a network node 16 for extension of reference signal ports for large antenna arrays according to principles set forth herein. One or more blocks described herein may be performed by one or more elements of network node 16 such as by one or more of processing circuitry 68 (including the port assignment unit 32), processor 70, radio interface 62 and/or communication interface 60. Network node 16 such as via processing circuitry 68 and/or processor 70 and/or radio interface 62 and/or communication interface 60 is configured to assign the M reference signal ports to M antenna elements of the N antenna elements (Block S100). The process also includes transmitting a reference signal using the M antenna elements, the M antenna elements used to form a first beam sufficiently broad to broadcast the reference signal over a geographical area sized to support a plurality of wireless devices, WDs (Block S102). The process further includes receiving a precoding matrix indicator, PMI, from a first WD (22) of the plurality of WDs, using the N antenna elements, signals received at the N antenna elements being weighted to form a second beam sufficiently narrow to enable spatial selection of the first WD (22) of the plurality of WDs by the network node (16) (Block S104).

Having described the general process flow of arrangements of the disclosure and having provided examples of hardware and software arrangements for implementing the processes and functions of the disclosure, the sections below provide details and examples of arrangements for extension of reference signal ports for large antenna arrays.

Two techniques are presented herein to facilitate simultaneous wide reference signal beam patterns and narrow data beams on lengthy arrays.

Technique 1: Decoupling the beam patterns of reference signals (CSI-RS) based precoders and shared traffic channels, such as a physical downlink shared channel (PDSCH), in closed loop codebook-based transmission modes.

In this technique, a separate beam pattern is used to transmit CSI-RS signals to create a desired wide coverage area while allowing a network node 16 to use the reported PMI to properly create desired beam patterns for the shared traffic channel towards the WD 22.

One example of this technique is to only use a subset of the transmitter antennas 43 of the radio interface 42 to transmit the reference signals. As an example, assume there are 8 CSI-RS ports and Nt transmit antenna elements (Nt>8). Instead of using all the antenna elements to transmit the CSI-RS, any set of 8 adjacent antenna elements to transmit 8 CSI-RS ports may be used. When the WD 22 reports the PMI based on this arrangement, the network node 16 deduces what is the best beamforming pattern for that WD 22 and calculates the proper antenna weights for the PDSCH and DMRS using all the transmit antenna elements to achieve high beamforming gain towards the WD 22 while keeping a wide CSI-RS beam pattern.

Technique 2: reciprocity-assisted beamforming of codebook-based transmission modes on lengthy arrays.

Like Technique 1, CSI-RS beam patterns are decoupled from PDSCH and DMRS beam patterns. In this technique, each CSI-RS port is connected to one antenna by skipping some antennas in between antennas used for CSI-RS. For instance, if the length of array is double the number of CSI-RS ports, each CSI-RS port is connected to every other antenna. The CSI-RS is thus still wide. The WDs will report back their best estimate of PMIs which is based on a number of CSI-RS ports. To determine the phase of the skipped antennas, the phase shift of adjacent antennas is used in the reported PMI and interpolated for the antenna between adjacent elements. This will allow for larger resolution of data beams and higher beamforming gain. However, since the spacing between antennas in the CSI-RS beam is larger, it might create some grating lobes. In cases where this occurs, the uplink channel estimates are used to determine which lobe is the one toward the WD 22.

The above two techniques are described in greater detail below.

Figure 4:
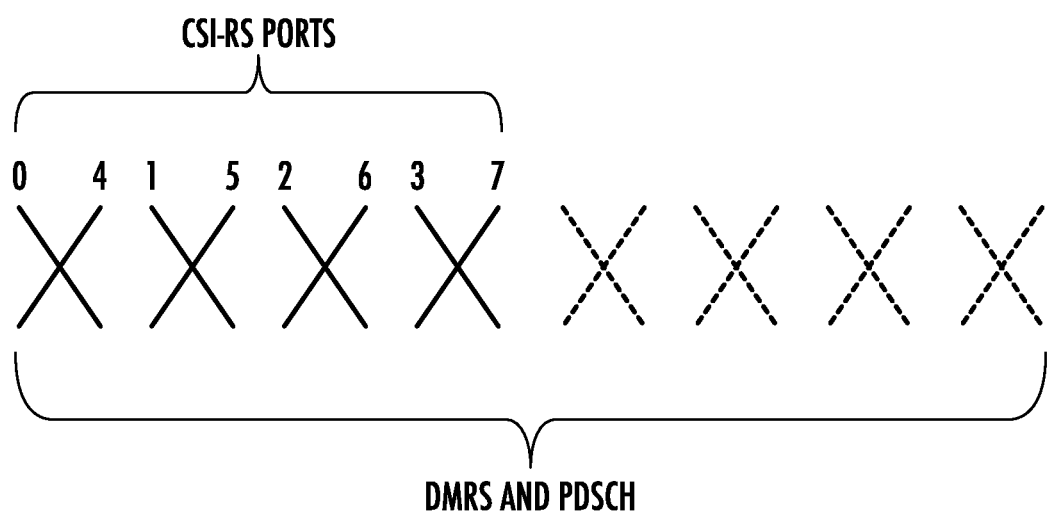
FIG. 4 is an illustration of an array of antenna elements for transmitting DMRS and PDSCH.
Figure 5:
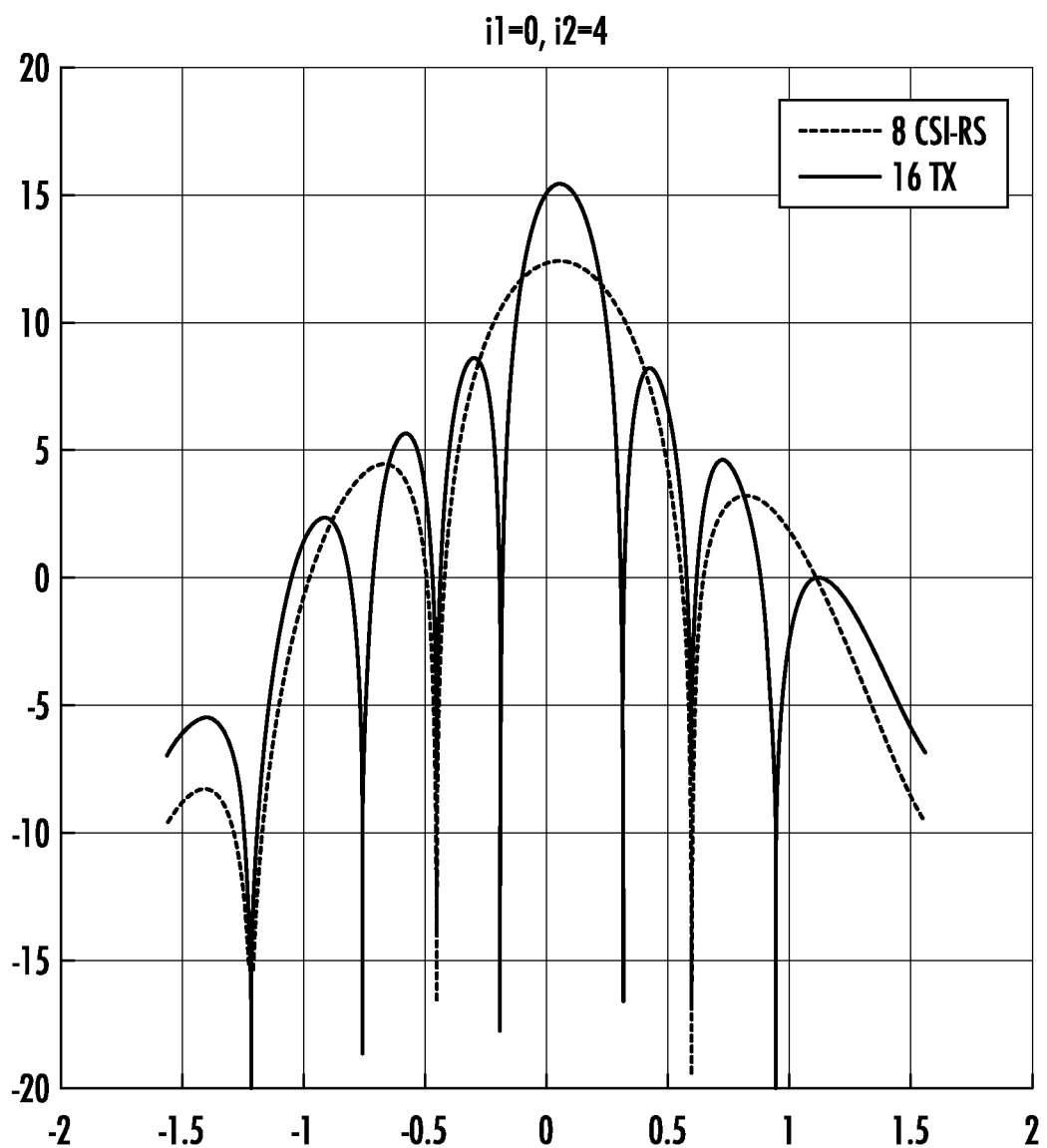
FIG. 5 is a graph of beams from two different arrays, one being twice the length of the other.

Technique 1:

In order to provide a broad and wide CSI-RS pattern, each port is connected to one antenna as shown in FIG. 4. Upon transmission of the CSI-RS, the WD 22 may report to the base station the best PMI based on the received broad common channel. Since this PMI indicates the phase shifts on the first 8 antennas, the same phase shift may be used and extended to 16 antennas. For instance if the reported PMI from the WD 22 is $i_1=0$, $i_2=4$, then the phase shifts of (one polarization) of the first 4 columns are [1 $e^{j2\pi/32}$ $e^{j4\pi/32}$ $e^{j6\pi/32}$]. Using the same phase shift, a beam with the same direction on 8 columns of antennas as follows can be constructed as follows: [1 $e^{j2\pi/32}$ $e^{j4\pi/32}$ $e^{j6\pi/32}$ $e^{j8\pi/32}$ $e^{j10\pi/32}$ $e^{j12\pi/32}$ $e^{j14\pi/32}$]. The beams constructed using these two arrays are shown in FIG. 5.

Figure 6:
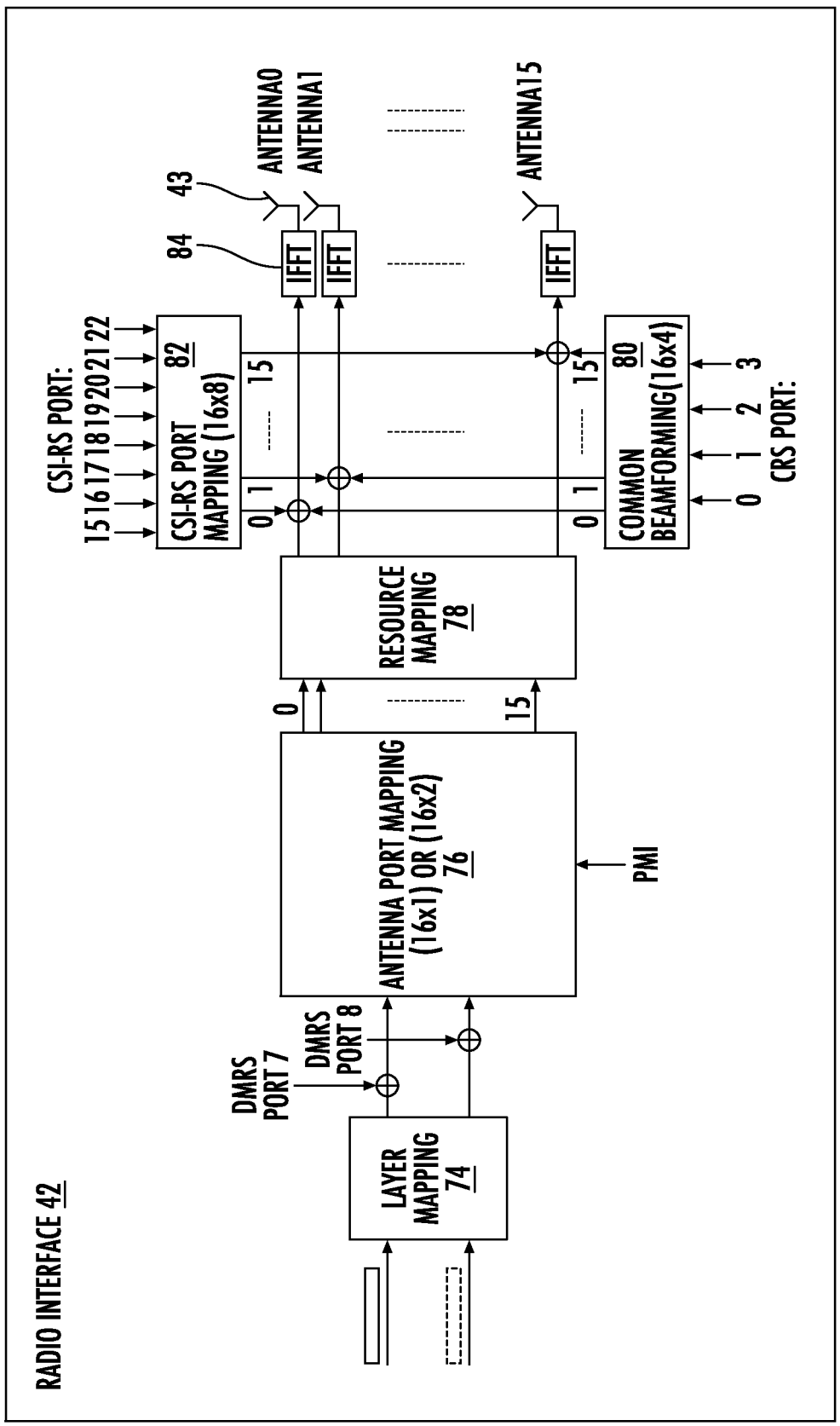
FIG. 6 is a block diagram of some relevant components of a radio interface of a network node.

In this case, a narrower beam towards the same direction as the WD 22 has reported is created, with 3-dB higher beamforming gain than what the WD 22 expects (since the number of antennas is doubled in this example). The block diagram of the technique presented herein is shown in FIG. 6, where the port mapping for data channels (PDSCH and DMRS) is decoupled from the port mapping of CSI-RS ports. In particular, FIG. 6 is a block diagram of some components of the radio interface 42, having a layer mapping module 74 which is configured to map layers to multiple antenna ports. An antenna port mapping unit 76 receives PMI and is configured to map antenna ports to logical ports. A resource mapping unit 78 is configured to map IQ symbols to the allocated frequency domain resources. The common beamforming unit 80 is configured to determine weights for beamforming of common channels as well as cell reference signals (CRS in the case of LTE). The CSI-RS port mapping unit 82 is configured to map the CSI-RS ports to different antennas according to the methods discussed in this disclosure. Inverse fast Fourier transform (IFFT) unit 84 transforms the signals on each port to a time domain signal that is radiated by an antenna 43.

Figure 7:
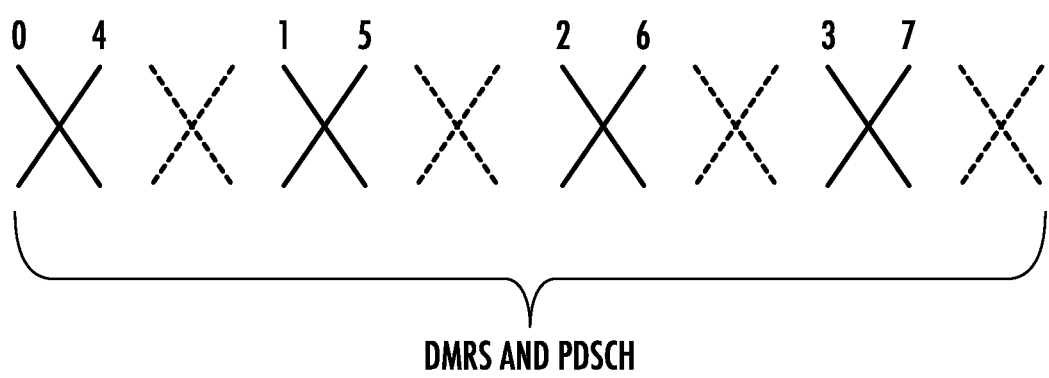
FIG. 7 shows CSI-RS ports connected to every other antenna of an array.
Figure 8:
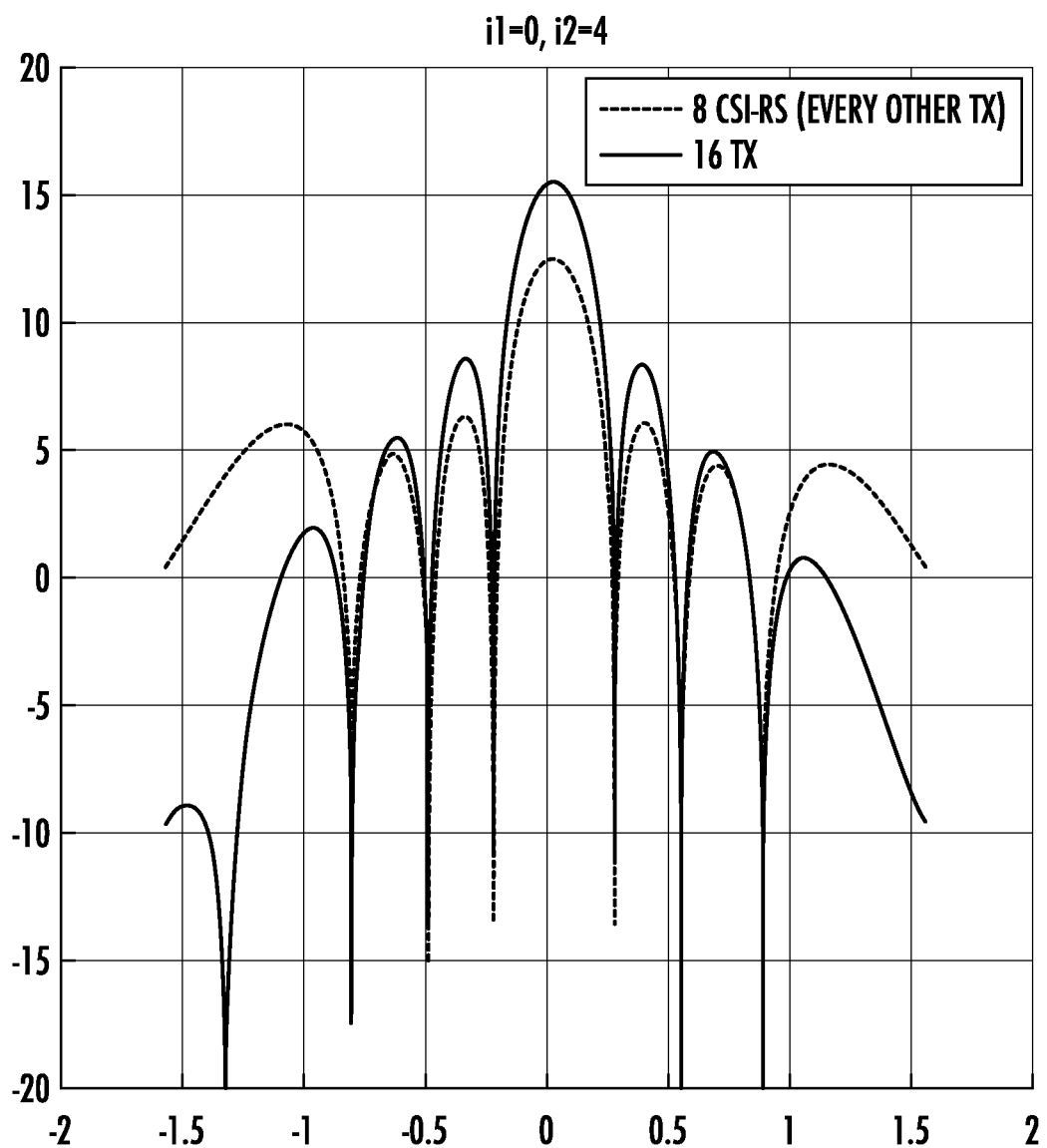
FIG. 8 is a graph of beams generated by the array of FIG. 7.

Technique 2:

In this technique, CSI-RS ports are connected to every other antenna of the array as shown in FIG. 7. The WD 22 reports back to the network node 16 the best PMI based on the received CSI-RS ports. Since this PMI indicates the phase shifts on every other antenna, to extend that phase shift to the whole array, the phase shifts obtained from the PMI may be interpolated. In other words, for an antenna, the phase shifts of two adjacent antennas may be averaged. This means that each antenna has the phase shift with the same phase progression. For instance if the reported PMI from the WD 22 is $i_1=0$, $i_2=4$, then the phase shift on (one polarization) of the first 4 columns are [1 $e^{j2\pi/32}$ $e^{j4\pi/32}$ $e^{j6\pi/32}$]. Using the interpolation technique, a beam can be constructed with the same direction on 8 columns of antennas as follows: [1 $e^{j2\pi/64}$ $e^{j4\pi/64}$ $e^{j6\pi/64}$ $e^{j8\pi/64}$ $e^{j10\pi/64}$ $e^{j12\pi/64}$ $e^{j14\pi/64}$]. The beams constructed using these two arrays are shown in FIG. 8.

In this case, a beam is obtained that is directed toward the same direction as the reported PMI with 3-dB higher beamforming gain (since the number of antennas is doubled).

Figure 9:
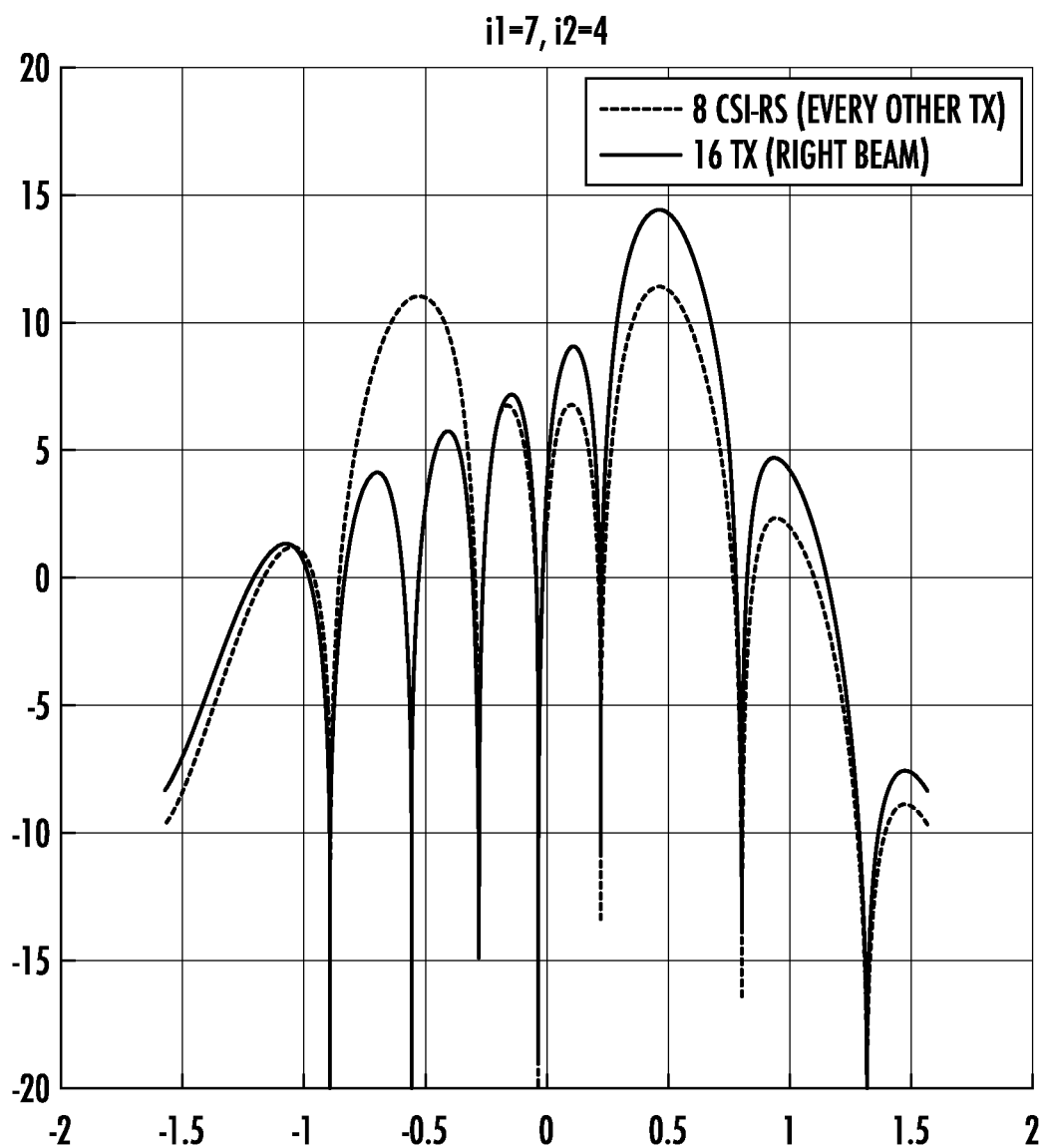
FIG. 9 shows a graph of two main lobes arising from grating lobes.

A benefit of this technique is that the resolution of beams will be doubled compared to Technique 1. This is especially because of doubling the discrete Fourier transform (DFT) size of PMI at the network node 16 by the interpolating technique. However, there may be costs for increasing the resolution. Since the ports are transmitted on every other antenna with double spacing compared to the first technique, some of the precoders might have grating lobes. For instance, the beam pattern of PMI $i_1=7$, $i_2=4$ is shown in FIG. 9. As can be seen from this figure, the network node 16 may decide between the two main lobes where the WD 22 is really located. In this case, reciprocity from the uplink channel may be used. In particular, with a rough estimate of a direction of arrival (DoA) in the uplink, the network node 16 can decide between left and right lobes and choose the correct beam toward the WD 22. As such the benefit of having higher resolution comes at the cost of higher complexity of implementing reciprocity in the system.

Figure 10:
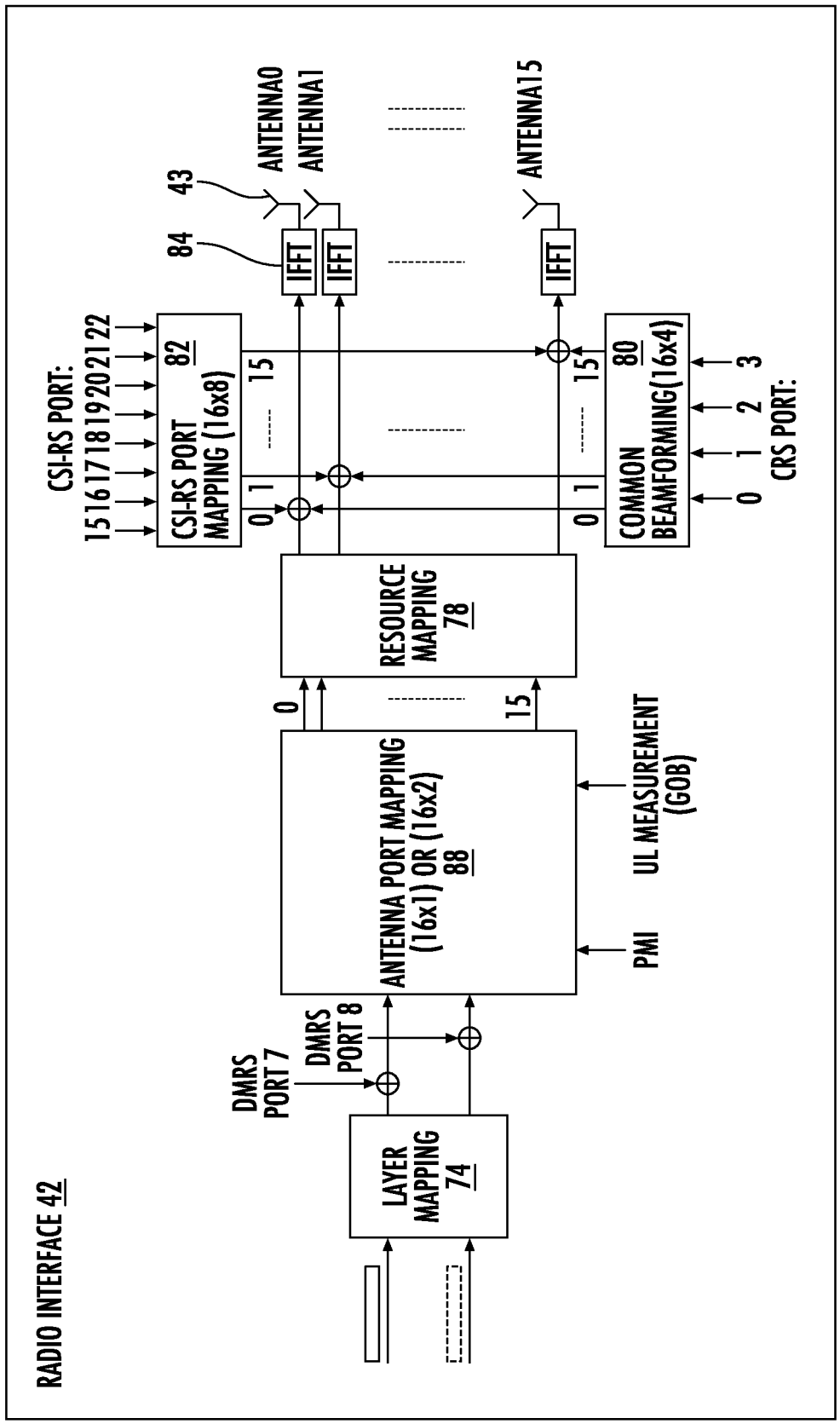
FIG. 10 is a block diagram of some relevant components of an alternative radio interface of a network node.

The block diagram of some components of the radio interface 42 for implementing Technique 2 is illustrated in FIG. 10 in which the port to antenna mapping of data channels (PDSCH and DMRS) is different from the port mapping of CSI-RS ports. The network node 16 also may use UL measurements in order to decide between the right and the left lobe. FIG. 10 shows that an antenna port mapping unit 88 receives a UL measurement (for example in terms of the Grid of Beams (GOB) index) that is used to determine the mapping.

To summarize, each technique may have the following features.

Technique 1:
codebook-based transmission;
keeps the same resolution as PMIs;
realizes full beamforming gain due to having higher number of antennas 43; and
no degradation in coverage (broad common beam).

Technique 2:
Reciprocity-assisted codebook transmission;
Higher resolution than PMIs;
realizes full beamforming gain due to having higher number of antennas 43; and
no degradation in coverage (broad common beam).

According to one aspect, a method in a network node 16 having N antenna elements and M reference signal ports, N being greater than M, is provided. The method includes assigning the M reference signal ports to M antenna elements of the N antenna elements. The method also comprises transmitting a reference signal using the M antenna elements, the M antenna elements used to form a first beam sufficiently broad to broadcast the reference signal over a geographical area sized to support a plurality of wireless devices. The method further includes receiving a precoding matrix indicator, PMI, from a first WD 22 of the plurality of WDs, using the N antenna elements, signals received at the N antenna elements being weighted to form a second beam sufficiently narrow to enable spatial selection of the first WD 22 of the plurality of WDs by the network node 16.

According to this aspect, in some embodiments, the method further includes transmitting a demodulation reference signal, DMRS, and/or a physical downlink shared channel, PDSCH, using the N antenna elements with the transmitted signal being weighted to form the second beam. In some embodiments, the M antenna elements are distributed among the N antenna elements, there being at least one intervening antenna element of the N antenna elements between any consecutive ones of the M antenna elements. In some embodiments, the method also includes identifying which one of a plurality of main lobes appearing in a signal from the M antenna elements is not a grating lobe. In some embodiments, a phase of an antenna element that is not one of the M antenna elements is extrapolated from phases of at least one of the M antenna elements. In some embodiments, the received PMI indicates a phase shift on every other antenna of the N antenna elements. In some embodiments, the M antenna elements form a spatially broad reference signal beam and the N antenna elements form a spatially narrow downlink signal beam, the spatially broad reference signal beam being broader than the spatially narrow downlink signal beam. In some embodiments, beamforming weights are applied to signals of the N antenna elements to steer a directive beam toward the first WD 22 of the plurality of WDs. In some embodiments, the M reference signal ports are channel state information reference signal, CSI-RS, ports. In some embodiments, the M antenna elements are adjacent in a row or column of the N antenna elements.

According to another aspect, a network node 16 having N antenna elements and M reference signal ports, N being greater than M includes processing circuitry 48 configured to assign the M reference signal ports to M antenna elements of the N antenna elements, cause transmission of a reference signal using the M antenna elements, the M antenna elements used to form a first beam sufficiently broad to broadcast the reference signal over a geographical area sized to support a plurality of wireless devices, WDs, and cause reception of a precoding matrix indicator, PMI, from a first WD 22 of the plurality of WDs, using the N antenna elements, signals received at the N antenna elements being weighted to form a second beam sufficiently narrow to enable spatial selection of the first WD 22 of the plurality of WDs by the network node 16.

According to this aspect, in some embodiments, the processing circuitry 48 is further configured to cause transmission of a demodulation reference signal, DMRS, and/or a physical downlink shared channel, PDSCH, using the N antenna elements with the transmitted signal being weighted to form the second beam. In some embodiments, the M antenna elements are distributed among the N antenna elements, there being at least one intervening antenna element of the N antenna elements between any consecutive ones of the M antenna elements. In some embodiments, the processing circuitry 48 is further configured to identify which one of a plurality of main lobes appearing in a signal from the M antenna elements is not a grating lobe. In some embodiments, a phase of an antenna element that is not one of the M antenna elements is extrapolated from phases of at least one of the M antenna elements. In some embodiments, the received PMI indicates a phase shift on every other antenna of the N antenna elements. In some embodiments, the M antenna elements form a spatially broad reference signal beam and the N antenna elements form a spatially narrow downlink signal beam, the spatially broad reference signal beam being broader than the spatially narrow downlink signal beam. In some embodiments, beamforming weights are applied to signals applied to the N antenna elements to steer a directive beam toward the first WD 22. In some embodiments, the reference signal ports are channel state information reference signal, CSI-RS, ports. In some embodiments, the M antenna elements are adjacent in a row or column of the N antenna elements.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviations | Explanation |
| --- | --- |
| PMI | Precoding Matrix Indicator |
| CSI-RS | Channel State Information-Reference |
| PDSCH | Physical Downlink Shared Channel |
| PDCCH | Physical Downlink Common Channel |
| DoA | Direction of Arrival |
| DMRS | Demodulation Reference Signal |
| SINR | Signal to Interference and Noise Ratio |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node having N antenna elements and M reference signal ports, N being greater than M, the method comprising:
   assigning the M reference signal ports to M antenna elements of the N antenna elements;
   transmitting a reference signal using the M antenna elements, the M antenna elements used to form a first beam sufficiently broad to broadcast the reference signal over a geographical area sized to support a plurality of wireless devices, WDs; and
   receiving a precoding matrix indicator, PMI, from a first WD of the plurality of WDs, using the N antenna elements, signals received at the N antenna elements being weighted to form a second beam sufficiently narrow to enable spatial selection of the first WD of the plurality of WDs by the network node.

2. The method of claim 1, further comprising transmitting at least one of a demodulation reference signal, DMRS, and a physical downlink shared channel, PDSCH, using the N antenna elements with the transmitted signal being weighted to form the second beam.

3. The method of claim 1, wherein the M antenna elements are distributed among the N antenna elements, there being at least one intervening antenna element of the N antenna elements between any consecutive ones of the M antenna elements.

4. The method of claim 1, further comprising identifying which one of a plurality of main lobes appearing in a signal from the M antenna elements is not a grating lobe.

5. The method of claim 1, wherein a phase of an antenna element that is not one of the M antenna elements is extrapolated from phases of at least one of the M antenna elements.

6. The method of claim 1, wherein the received PMI indicates a phase shift on every other antenna of the N antenna elements.

7. The method of claim 1, wherein the M antenna elements form a spatially broad reference signal beam and the N antenna elements form a spatially narrow downlink signal beam, the spatially broad reference signal beam being broader than the spatially narrow downlink signal beam.

8. The method of claim 1, wherein beamforming weights are applied to signals of the N antenna elements to steer a directive beam toward the first WD of the plurality of WDs.

9. The method of claim 1, wherein the M reference signal ports are channel state information reference signal, CSI-RS, ports.

10. The method of claim 1, wherein the M antenna elements are adjacent in a row or column of the N antenna elements.

11. A network node having N antenna elements and M reference signal ports, N being greater than M, the network node comprising processing circuitry configured to:
   assign the M reference signal ports to M antenna elements of the N antenna elements;
   cause transmission of a reference signal using the M antenna elements, the M antenna elements used to form a first beam sufficiently broad to broadcast the reference signal over a geographical area sized to support a plurality of wireless devices, WDs; and
   cause reception of a precoding matrix indicator, PMI, from a first WD of the plurality of WDs, using the N antenna elements, signals received at the N antenna elements being weighted to form a second beam sufficiently narrow to enable spatial selection of the first WD of the plurality of WDs by the network node.

12. The network node of claim 11, wherein the processing circuitry is further configured to cause transmission of at least one of a demodulation reference signal, DMRS, and a physical downlink shared channel, PDSCH, using the N antenna elements with the transmitted signal being weighted to form the second beam.

13. The network node of claim 11, wherein the M antenna elements are distributed among the N antenna elements, there being at least one intervening antenna element of the N antenna elements between any consecutive ones of the M antenna elements.

14. The network node of claim 11, wherein the processing circuitry is further configured to identify which one of a plurality of main lobes appearing in a signal from the M antenna elements is not a grating lobe.

15. The network node of claim 11, wherein a phase of an antenna element that is not one of the M antenna elements is extrapolated from phases of at least one of the M antenna elements.

16. The network node of claim 11, wherein the received PMI indicates a phase shift on every other antenna of the N antenna elements.

17. The network node of claim 11, wherein the M antenna elements form a spatially broad reference signal beam and the N antenna elements form a spatially narrow downlink signal beam, the spatially broad reference signal beam being broader than the spatially narrow downlink signal beam.

18. The network node of claim 11, wherein beamforming weights are applied to signals applied to the N antenna elements to steer a directive beam toward the first WD.

19. The network node of claim 11, wherein the reference signal ports are channel state information reference signal, CSI-RS, ports.

20. The network node of claim 11, wherein the M antenna elements are adjacent in a row or column of the N antenna elements.

* * * * *